United States Patent
Maes (10) Patent No.: US 7,570,964 B2
(45) Date of Patent: Aug. 4, 2009

(54) MOBILE E-MAIL CONFIRMATION SUPPORT

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 47 days.

(21) Appl. No.: 11/138,789

(22) Filed: May 25, 2005

(65) Prior Publication Data

US 2006/0270389 A1 Nov. 30, 2006

(51) Int. Cl.
*H04W 4/00* (2009.01)
(52) U.S. Cl. .................. 455/466; 455/414.1; 455/419; 370/329; 370/232
(58) Field of Classification Search .............. 455/466, 455/414.1, 419; 709/229, 232; 370/229, 370/232, 329
See application file for complete search history.

(56) References Cited

U.S. PATENT DOCUMENTS

| | | | |
|---|---|---|---|
| 6,108,519 A * | 8/2000 | Nitta | 340/7.27 |
| 6,157,624 A * | 12/2000 | Zancho | 370/316 |
| 6,230,019 B1 * | 5/2001 | Lee | 455/466 |
| 6,430,408 B1 * | 8/2002 | Dorenbosch | 455/414.1 |
| 6,795,711 B1 * | 9/2004 | Sivula | 455/466 |
| 7,024,198 B2 * | 4/2006 | Knaebchen et al. | 455/445 |
| 7,062,269 B2 * | 6/2006 | Albertsson et al. | 455/432.1 |
| 2002/0184319 A1 * | 12/2002 | Willner et al. | 709/206 |
| 2004/0192272 A1 * | 9/2004 | Seo | 455/414.1 |
| 2005/0143050 A1 * | 6/2005 | Foll | 455/406 |

* cited by examiner

*Primary Examiner*—Nghi H Ly
(74) *Attorney, Agent, or Firm*—Townsend and Townsend and Crew LLP (57) ABSTRACT

Techniques for providing services to a mobile device not offered on the device are provided. The techniques include intercepting a message from a mobile device at a server. It is then determined if a service should be performed, where the service is not offered on the mobile device. A confirmation message is sent to the mobile device requesting confirmation that the service should be performed. The message is sent in a channel that the mobile device can communicate through. If a reply message is received from the mobile device, it is determined if an action should taken based on the reply message. For example, a confirmation message may ask if the service should be performed and if the answer is yes, the service is then performed.

19 Claims, 4 Drawing Sheets

MOBILE E-MAIL CONFIRMATION SUPPORT

BACKGROUND OF THE INVENTION

The present invention generally relates to mobile communications and more specifically to techniques for mobile email confirmation services.

Advances in technology have allowed a user to communicate while being mobile. For example, access to email (private or corporate) while on the road may be provided using mobile devices. For example, messages may be received using email clients on mobile devices (via an Internet browser on the mobile device), via messaging, such as short message service (SMS) and multimedia message service (MMS), using email devices specifically configured for receiving emails (blackberry and goodlink devices), etc.

The applications that are used to read emails on the mobile devices are often less powerful versions of a user's email application found on a desktop computer. For example, the mobile device being used may offer far fewer features than those offered on the desktop computer. This may be because the computing power of a mobile device is not sufficient to support some of the functions or it is not feasible to include the functions on the mobile device. Accordingly, users have to access email without using these functions.

Some functions provided on the desktop computer are important and it may be critical that they are used. For example, certain virus-checking applications, privacy protection applications, etc. may be provided locally on the desktop computer. The applications can automatically provide the services to a user when the user is using the desktop applications. Because the applications are local, the emails are not sent before the service is invoked. This is advantageous because changes can be made before the email leaves the desktop computer. However, these applications may be too complicated to be included on a mobile device. This may be because of a lack of application programming interface (API) support, lack of memory, lack of computing power, etc. Thus, users may have to forego using the services and risk being infected by a virus or risk sending privacy information.

BRIEF SUMMARY OF THE INVENTION

The present invention generally relates to using messaging in order to provide services that are not offered on a mobile device.

In one embodiment, techniques for providing services to a mobile device not offered on the device are provided. The techniques include intercepting a message from a mobile device at a server. It is then determined if a service should be performed, where the service is not offered on the mobile device. A confirmation message is sent to the mobile device requesting confirmation that the service should be performed. The message is sent in a channel that the mobile device can communicate through. If a reply message is received from the mobile device, it is determined if an action should taken based on the reply message. For example, a confirmation message may ask if the service should be performed and if the answer is yes, the service is then performed.

In one embodiment, a method for providing services to a mobile device not offered on the mobile device is provided. The method comprises: intercepting a message from the mobile device at a server; determining if a service should be performed, the service not being offered on the mobile device; sending a confirmation message to the mobile device requesting confirmation that the service should be performed, the message sent in a channel the mobile device can communicate through; and if a reply message is received from the mobile device, determining an action to take based on the reply message.

In another embodiment, a method for receiving services at a mobile device not offered on the mobile device is provided. The method comprises: sending a message from the mobile device to a destination, wherein the message in intercepted at a server, the server determining if a service should be performed, the service not being offered on the mobile device; receiving a confirmation message at the mobile device requesting confirmation that the service should be performed, the message received in a channel the mobile device can communicate through; and generating a reply message at the mobile device confirming whether the service should be performed; and sending the reply message to the server, the server determining an action to take based on the reply message.

In yet another embodiment, a system for providing services is provided. The system comprises: a mobile device configured to send a message; and a server configured to: intercept the message from the mobile device; determine if a service should be performed, the service not being offered on the mobile device; send a confirmation message to the mobile device requesting confirmation that the service should be performed, the message sent in a channel the mobile device can communicate through; and if a reply message is received from the mobile device, determine an action to take based on the reply message.

In another embodiment, an information storage medium having a plurality of instructions adapted to perform a set of steps for providing services to a mobile device not offered on the mobile device is provided. The steps include: intercepting a message from the mobile device at a server; determining if a service should be performed, the service not being offered on the mobile device; sending a confirmation message to the mobile device requesting confirmation that the service should be performed, the message sent in a channel the mobile device can communicate through; and if a reply message is received from the mobile device, determining an action to take based on the reply message.

In another embodiment, an information storage medium having a plurality of instructions adapted to direct an information processing device to perform a set of steps for receiving services at a mobile device not offered on the mobile device is provided. The steps include: sending a message from the mobile device to a destination, wherein the message in intercepted at a server, the server determining if a service should be performed, the service not being offered on the mobile device; receiving a confirmation message at the mobile device requesting confirmation that the service should be performed, the message received in a channel the mobile device can communicate through; and generating a reply message at the mobile device confirming whether the service should be performed; and sending the reply message to the server, the server determining an action to take based on the reply message.

A further understanding of the nature and the advantages of the inventions disclosed herein may be realized by reference of the remaining portions of the specification and the attached drawings.

DETAILED DESCRIPTION OF THE INVENTION

Figure 1:
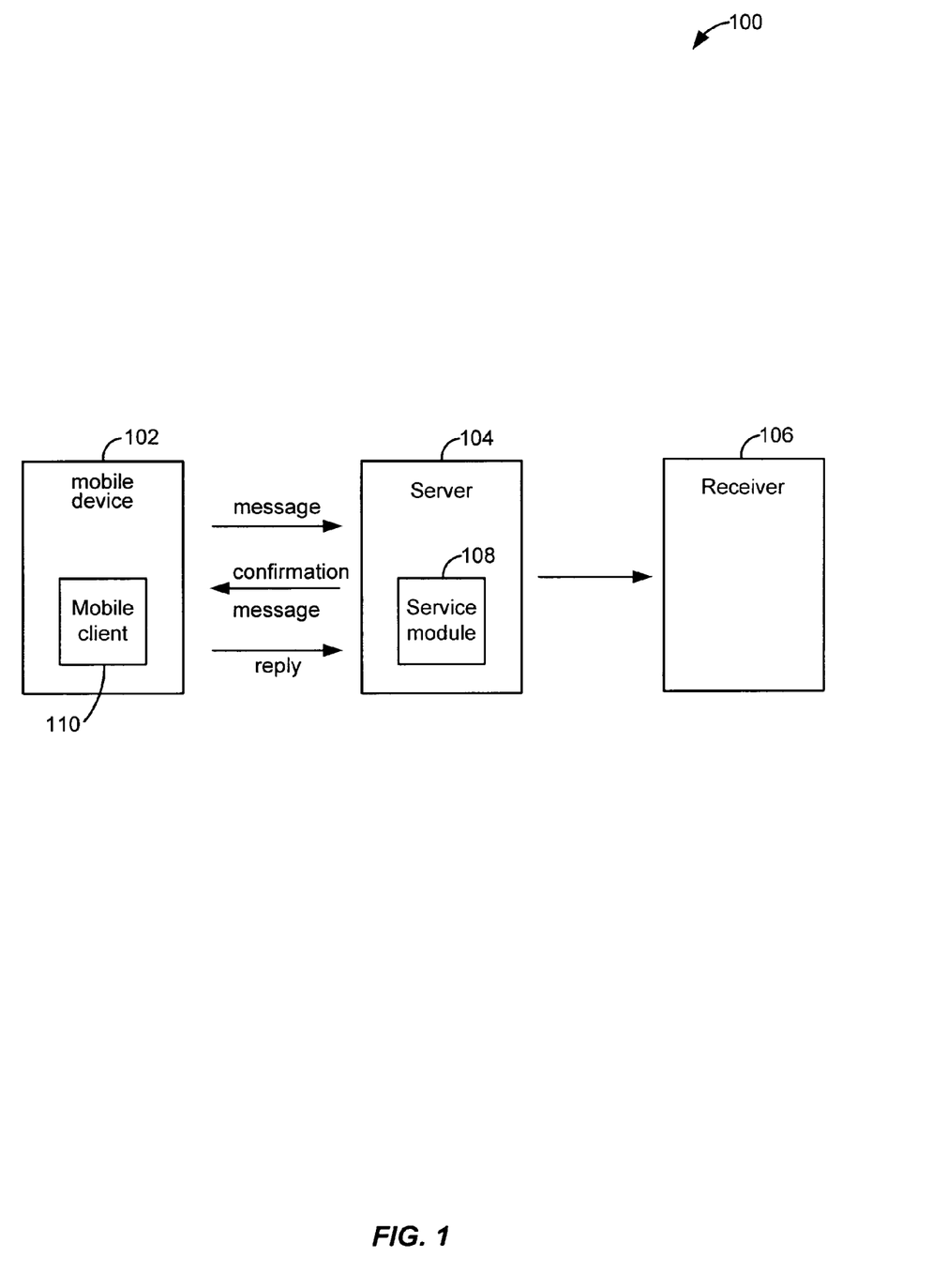
FIG. 1 depicts a system for providing services to a mobile device according to one embodiment of the present invention.

FIG. 1 depicts a system 100 for providing services to a mobile device 102 according to one embodiment of the present invention. As shown, system 100 includes a mobile device 102, a server 104, and a receiver 106. It will be recognized that any number of mobile devices 102, servers 104 and receivers 106 may be provided in system 100.

Mobile device 102 may be any mobile device. For example, mobile device 102 may be a cellular telephone, mobile email device, personal digital assistant (PDA), pocket PC, laptop computer, etc.

Receiver 106 may be any device configured to receive a message. For example, receiver 106 may be another mobile device 102, or any other device, such as a personal computer with an email client, an instant message client, etc.

Mobile device 102 may include a mobile client 110 that is configured to perform messaging. For example, mobile client 110 may include an application configured to communicate messages through messaging channels, such as email, SMS, MMS, push, voice, instant messaging, etc. Mobile device 102 may be configured to send messages through any combination of these channels.

Mobile device 102 often offers fewer services for messaging than that offered from a desktop or networked computer. For example, a desktop computer connected to a corporate network may offer a multitude of services, such as virus checking services, privacy protection services, metadata removal services, etc. These services can be offered because the computing power on a desktop computer is far greater than a mobile device 102.

The virus-checking service offers virus checking for messages sent to and from a user. The privacy protection services scan for private or confidential information, such as addresses, Social Security numbers, confidential information, etc., and metadata removal services remove metadata that may be associated with documents, such as Microsoft word documents.

The applications that perform these services all need confirmation from the user in order to perform these services. For example, before any privacy information can be removed from an email, the user is typically prompted with a question box asking whether the privacy information should be removed. The user can then click a "yes" icon, typically using a mouse, in order to confirm that the privacy information should be removed. The confirmation is easily provided using an application installed locally on the device.

Providing the above services on the mobile device 102, however, is often difficult. This may be because the application is not stored locally on the mobile device 102. Thus, the service cannot be applied before a message is sent by mobile device 102. Also, mobile device 102 may not have the appropriate APIs or processing capabilities in order to provide the services of the application. For example, mobile device 102 may not include enough memory to install the application or may not have enough computing power to efficiently run the application.

Accordingly, a service module 108 is provided on server 104 to provide the services. Server 104 is remotely located from mobile device 102 and may be any server configured to route messages for mobile device 102. For example, server 104 may be an email server.

Service module 108 is configured to provide the services. These services often require confirmation from a user. Because server 104 is remotely located from mobile device 102, confirmation cannot be easily obtained from a user. Conventionally, a pop-up dialogue box is used to ask for confirmation from a user on a desktop or networked computer. A dialogue box, however, cannot be displayed on the mobile device 102 because the application is not local to mobile device 102 and also because the message has already been sent. With the desktop or networked computer, the message is not sent and confirmation is requested. Because the service is not offered on mobile device 102, the message is sent and out of the domain of mobile device 102.

Typically, when a message leaves mobile device 102 and reaches a server 104, nothing can be done because the message has been sent and it will just be routed. However, server 104 is configured to intercept the message to determine if any services should be performed. Accordingly, when a message is sent to a receiver 106, service module 108 intercepts the message and determines if a service should be provided for the message. If so, a confirmation message is sent to mobile device 102. The confirmation message asks the user if the service should be performed on the message.

The confirmation message may be sent through any communication channels that the device 102 communicates in. For example, if mobile device 102 communicates through SMS, an SMS message may be sent asking for confirmation if the service should be provided. The user can then send an SMS to reply indicating either that the service should be performed or should not be performed. In other embodiments, instant messages, emails, etc. may be sent.

When server 104 receives a reply, service module 108 performs the service if a confirmation is received. If confirmation is not received, the email may be sent back to mobile device 102 for the user to correct the message or the message may be sent to a receiver 106 without performing any services.

Figure 2:
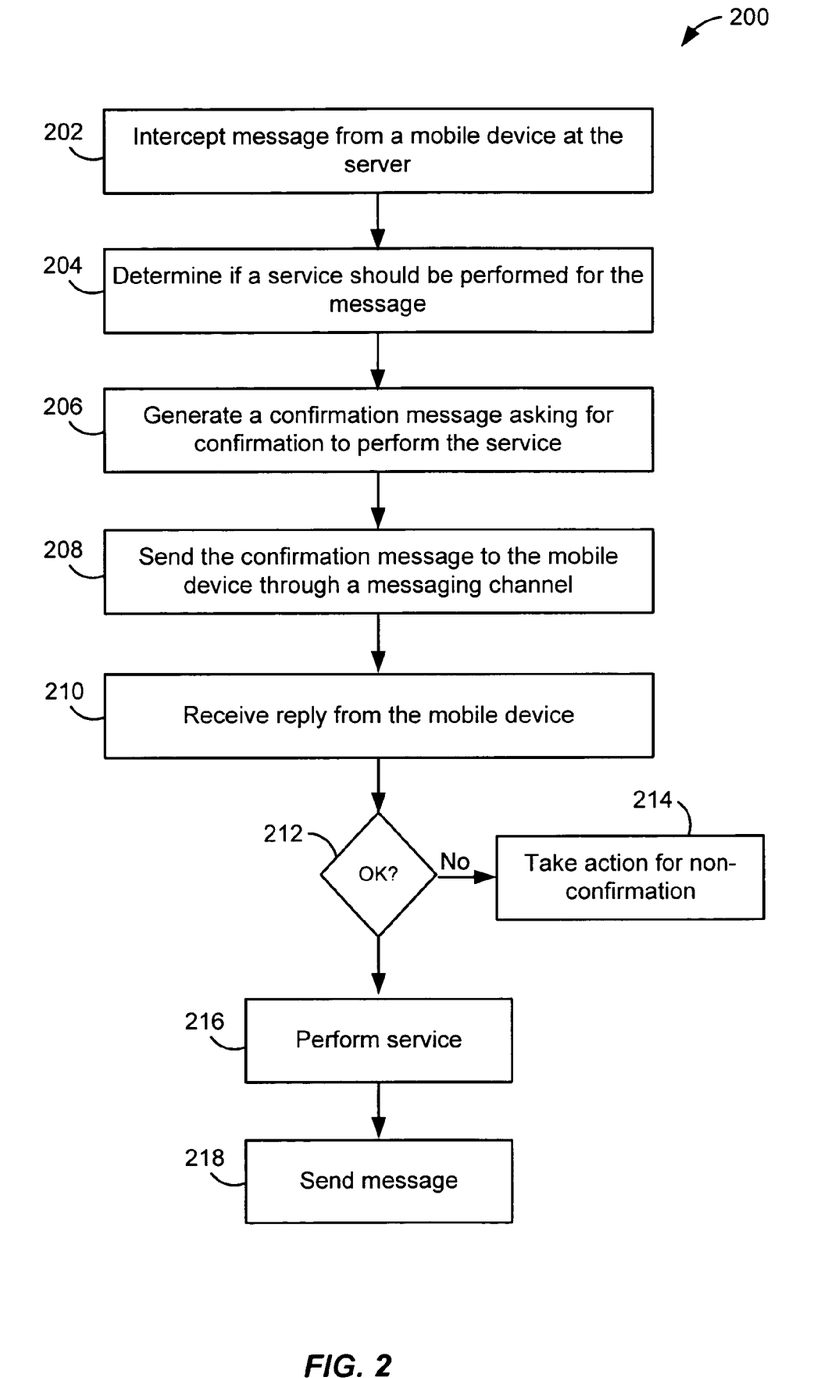
FIG. 2 depicts a simplified flowchart of a method for providing services not offered on a mobile device according to one embodiment of the present invention.

FIG. 2 depicts a simplified flowchart 200 of a method for providing services not offered on a mobile device 102 according to one embodiment of the present invention. In step 202, a message from mobile device 102 is intercepted at server 104. For example, mobile device 102 may send a message addressed to receiver 106. Server 104 is configured to intercept this message.

In step 204, service module 108 determines if a service should be performed for the message. For example, services that need confirmation may be performed for a message if it is determined that the message qualifies for any of these services.

In step 206, a confirmation message is generated asking for confirmation to perform the service. The confirmation message may be generated in any format that is compatible with messaging device 102. For example, any messaging channel that the messaging device 102 can communicate through may be used in order to format the message. In one embodiment, service module 108 stores the data formats in which messaging device 102 may communicate. Service module 108 determines a preferred data format and messaging channel, and generates a confirmation message for that messaging channel.

In step 208, the confirmation message is sent to mobile device 102 through a messaging channel. For example, if an SMS message was generated, it is sent through an SMS messaging channel.

In step 210, a reply is received from mobile device 102. For example, the user may review the message and determine an appropriate response. The message may ask, "Would you like to remove the following confidential information that is found in the message?" The user may compose a response message, possibly in the same format of the messaging channel the confirmation message was received in, or any other messaging channel. The response message is then sent to server 104.

In step 212, service module 108 determines if confirmation is received. If the user does not give confirmation, in step 214, an action for a negative confirmation response may be taken. For example, the email may be sent back to the user in order for the user to edit the email. Also, the email may just be sent without providing the service. In the above example, an email may be sent back to the user for removing any of the confidential information.

If the answer from the user may be "yes", in step 216 the service is performed. For example, the privacy information found in the message may be removed from the email. Any other actions that are required by the service module may also be performed.

In step 218, the message is sent after the service is performed. Accordingly, the message may be sent to receiver 106. This service may be transparent to receiver 106. Accordingly, mobile device 102 does not need to support the service; rather, mobile device 102 just needs to be able to send messages in any communication channels in order to have the service performed.

Figure 3:
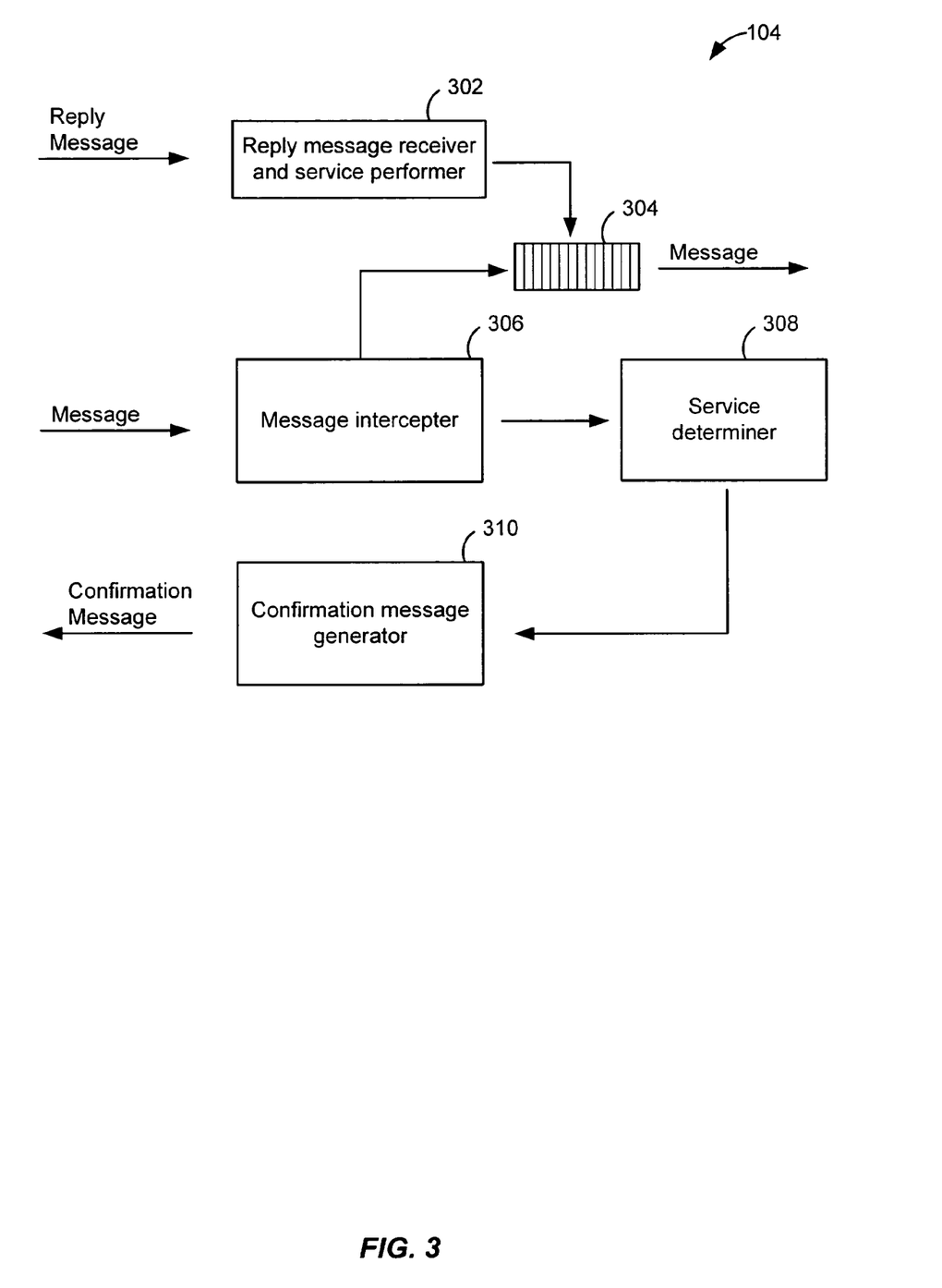
FIG. 3 depicts a more detailed embodiment of service module according to embodiments of the present invention.

FIG. 3 depicts a more detailed embodiment of service module 108 according to embodiments of the present invention. As shown, service module 108 includes a reply message receiver and service performer 302, a queue 304, a message interceptor 306, a service determiner 308, and a confirmation message generator 310.

Message interceptor 306 is configured to intercept a message from mobile device 102 to receiver 106. The message is intercepted when it is determined that a service should be performed on the message.

The message is stored in a queue 304. The message is stored in queue 304 in order for service module 108 to determine if a service should be performed. At a later time, if confirmation is received and the service is performed, the message may be sent from queue 304.

Service determiner 308 is configured to determine a service to perform on a message. For example, if settings indicate that email messages from mobile device 102 should be scanned for privacy information, service determiner 308 determines if there is any privacy information that should be removed.

If privacy information is found, confirmation message generator 310 then generates a confirmation message to send to mobile device 102. The message is formatted in a messaging channel that the mobile device 102 is configured to communicate in. This message is sent to mobile device 102, and then a user can reply to the confirmation message.

A reply message is received at reply message receiver and service performer 302. If confirmation is received to perform the service, the email message is retrieved from queue 304 and the service is performed. For example, privacy information may be removed from the message. The message is then sent to a receiver 106 after the service is performed.

Examples using embodiments of the present invention will now be described.

In one example, certain corporations may scan messages for confidential information. These confidential information protection applications check a message for anything confidential in the messages sent. If confidential information is detected, the user is prompted to confirm the confidential information should be removed. This service is typically not available locally on mobile device 102.

In this case, email messages may be intercepted and confirmation messages sent to mobile device 102 to remove confidential information in a communication channel mobile device 102 communicates in. When confirmation is received, the confidential information may be removed from the message or else the user may indicate that the email message should just be sent, and server 104 sends the email message. Typically, once the email message leaves mobile device 102, the services that are performed locally on a computing device cannot be performed. However, server 104 is configured to intercept a message and determines if services should be performed.

In another example, a user may require that a read receipt is sent when an email is read. Using mobile client 110 on mobile device 102, the read receipt functionality may not be possible. If a user is using a desktop computer, the option is available because a pop-up window is provided using a local application and the user select "click yes to send a read receipt" or "click no to not send a read receipt." This happens before the message is sent. The local application can then perform the action of sending a read receipt or not sending a read receipt. This action cannot be performed solely on mobile device 102. However, it may be desirable in order to provide the user with the service of providing a read receipt.

In this case, when a message is read by mobile device 102, a message is sent to server 104. Service module 108 intercepts the message and generates a read receipt message that is sent to mobile device 102. The user can then reply, communicating whether the read receipt should be generated or not. If the read receipt should be generated, confirmation may be sent to service module 108, and the read receipt is generated and sent.

Figure 4:
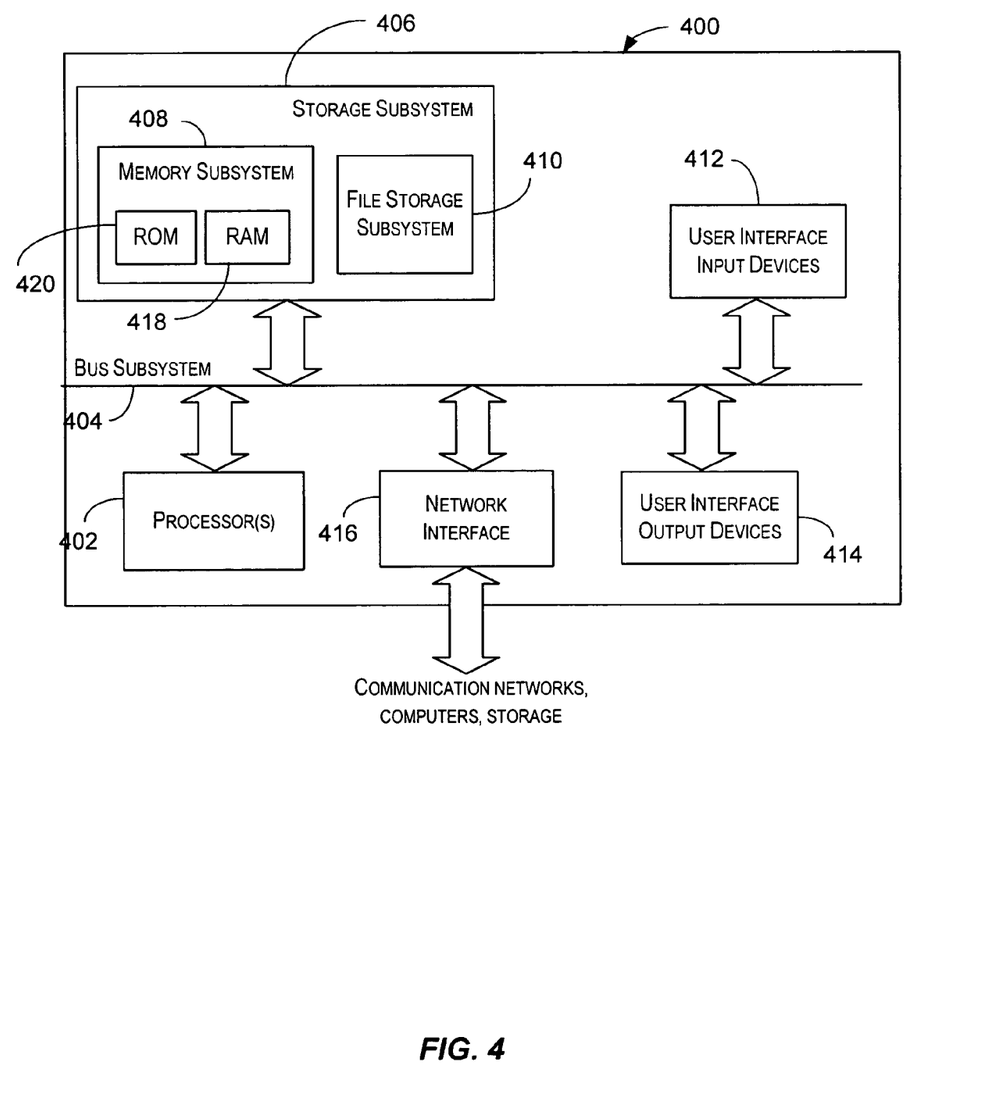
FIG. 4 is a simplified block diagram of a computer system according to an embodiment of the present invention.

FIG. 4 is a simplified block diagram of a computer system 400 according to an embodiment of the present invention. Embodiments of the present invention may be implemented using computer system 400. As shown in FIG. 4, computer system 400 includes at least one processor 402, which communicates with a number of peripheral devices via a bus subsystem 404. These peripheral devices may include a storage subsystem 406, comprising a memory subsystem 408 and a file storage subsystem 410, user interface input devices 412, user interface output devices 414, and a network interface subsystem 416. The input and output devices allow user interaction with computer system 400. A user may be a human user, a device, a process, another computer, or the like. Network interface subsystem 416 provides an interface to other computer systems and communication networks.

Bus subsystem 404 provides a mechanism for letting the various components and subsystems of computer system 400 communicate with each other as intended. The various subsystems and components of computer system 400 need not be at the same physical location but may be distributed at various locations within a network. Although bus subsystem 604 is shown schematically as a single bus, alternative embodiments of the bus subsystem may utilize multiple busses.

User interface input devices 412 may include a remote control, a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 400.

User interface output devices 414 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include all possible types of devices and ways to output information from computer system 600.

Storage subsystem 406 may be configured to store the basic programming and data constructs that provide the functionality of the computer system and of the present invention. For example, according to an embodiment of the present invention, software modules implementing the functionality of the present invention may be stored in storage subsystem 406. For example, modules implementing the functionality of service module 108 may be provided. These software modules may be executed by processor(s) 402. In a distributed environment, the software modules may be stored on a plurality of computer systems and executed by processors of the plurality of computer systems. Storage subsystem 406 may also provide a repository for storing various databases that may be used by the present invention. Storage subsystem 406 may comprise memory subsystem 408 and file storage subsystem 410.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Computer system 400 itself can be of varying types including a personal computer, a portable computer, a workstation, a computer terminal, a network computer, a mainframe, a kiosk, a personal digital assistant (PDA), a communication device such as a cell phone, or any other data processing system. Server computers generally have more storage and processing capacity then client systems. Due to the ever-changing nature of computers and networks, the description of computer system 400 depicted in FIG. 6 is intended only as a specific example for purposes of illustrating the preferred embodiment of the computer system. Many other configurations of a computer system are possible having more or fewer components than the computer system depicted in FIG. 4.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for providing services for a mobile device, comprising:
    intercepting a first message from the mobile device at a server;
    determining, at the server, whether the first message qualifies to have a service performed by the server, the service unable to be performed on the mobile device;
    sending a confirmation message from the server to the mobile device, the confirmation message requesting confirmation from a user of the mobile device that the service should be performed by the server, the confirmation message being sent in a channel through which the mobile device is able to communicate; and
    when a reply message is received by the server from the mobile device in response to the confirmation message, determining whether to perform the service based on the reply message.

2. The method of claim 1, further comprising sending the first message to an intended recipient without performing the service when indicated by the reply message.

3. The method of claim 1, wherein performing the service includes editing the first message and sending the edited message.

4. The method of claim 1, wherein the mobile device and server are remote from each other.

5. The method of claim 1, wherein the server comprises a messaging server.

6. The method of claim 1, wherein determining whether the first message qualifies to have a service performed comprises:
    reviewing the first message;
    alerting an application that a confirmation service should be performed; and
    generating the confirmation message.

7. The method of claim 1, wherein the channel comprises one of an email, a short message service (SMS), a multimedia message service (MMS), a push, a voice, and an instant message channel.

8. The method of claim 1, further comprising, if the reply message denies confirmation that the service should be performed, sending the first message back to the mobile device from the server.

9. The method of claim 8, further comprising sending a subsequent message asking a user of the mobile device to correct the first message.

10. A method for performing services for a mobile device not otherwise offered on the mobile device, the method comprising:
    sending a first message from the mobile device to a destination, the message being intercepted at a server operable to determine whether the first message qualifies to have a service performed for the first message, the service not being offered on the mobile device;
    receiving a confirmation message from the server at the mobile device, the confirmation message requesting confirmation that the service should be performed by the server, the confirmation message being received in a channel through which the mobile device is able to communicate;
    generating a reply message at the mobile device confirming whether the service should be performed; and
    sending the reply message to the server, the server being operable to determine whether to perform the service based on the reply message.

11. The method of claim 10, wherein if the reply message indicates that the service should be performed, the server performs the service.

12. The method of claim 10, wherein the mobile device and server are remote from each other.

13. The method of claim 10, wherein the server comprises a messaging server.

14. The method of claim 10, wherein the channel comprises one of an email, a short message service (SMS), a multimedia message service (MMS), a push, a voice, and an instant message channel.

15. The method of claim 10, further comprising, if the reply message denies confirmation that the service should be performed, causing the message to be sent back to the mobile device from the server.

16. The method of claim 15, further comprising receiving to the mobile device a message asking a user of the mobile device to correct the first message.

17. A system for providing services to a mobile device, the system comprising:
   a mobile device configured to send a first message; and
   a server configured to:
      intercept the first message from the mobile device;
      determine whether the first message qualifies to have a service performed on the first message, the service not being offered on the mobile device;
      send a confirmation message from the server to the mobile device requesting confirmation that the service should be performed, the confirmation message being sent in a channel through which the mobile device can communicate; and
      when a reply message is received by the server from the mobile device, determine whether to perform the service based on the reply message.

18. An information storage medium having a plurality of executable instructions adapted to direct an information processing device to perform a set of steps for providing services to a mobile device not offered on the mobile device, the steps including:
   intercepting a message from the mobile device at a server;
   determining at the server whether the first message qualifies to have a service performed for the first message, the service not being offered on the mobile device;
   sending a confirmation message from the server to the mobile device, the confirmation message requesting confirmation that the service should be performed, the confirmation message being sent in a channel through which the mobile device can communicate; and
   when a reply message is received at the server from the mobile device, determining at the server whether to perform the service based on the reply message.

19. An information storage medium having a plurality of executable instructions adapted to direct an information processing device to perform a set of steps for receiving services at a mobile device not offered on the mobile device, the steps including:
   sending a first message from the mobile device to a destination, the message being intercepted at a server operable to determine whether the first message qualifies to have a service performed for the first message, the service not being offered on the mobile device;
   receiving a confirmation message from the server at the mobile device, the confirmation message requesting confirmation that the service should be performed, the confirmation message being received in a channel through which the mobile device can communicate; and
   generating a reply message at the mobile device confirming whether the service should be performed; and
   sending the reply message to the server, the server operable to determine whether to perform the service based on the reply message.

* * * * *

UNITED STATES PATENT AND TRADEMARK OFFICE
CERTIFICATE OF CORRECTION

PATENT NO. : 7,570,964 B2 Page 1 of 1
APPLICATION NO. : 11/138789
DATED : August 4, 2009
INVENTOR(S) : Stephane H. Maes It is certified that error appears in the above-identified patent and that said Letters Patent is hereby corrected as shown below:

On sheet 3 of 4, in Figure 3, Box 306, line 1, delete "intercepter" and insert -- interceptor --, therefor.

Signed and Sealed this

Sixth Day of July, 2010

David J. Kappos
*Director of the United States Patent and Trademark Office*